United States Patent [19]

Waclawsky et al.

[11] Patent Number: 5,629,927

[45] Date of Patent: May 13, 1997

[54] MONITORING ATM NETWORKS FOR BURSTINESS USING CELL FULL OR CELL EMPTY LATENCY WITH MINIMUM INFORMATION

[75] Inventors: John G. Waclawsky, Frederick; Mahendran Velauthapillai, Adelphi, both of Md.

[73] Assignee: International Business Machines Corporation, Armonk, N.Y.

[21] Appl. No.: 455,423

[22] Filed: May 31, 1995

[51] Int. Cl.$^6$ .................................................. H04J 3/14
[52] U.S. Cl. .................... 370/253; 340/825.06; 370/394; 370/395; 370/411
[58] Field of Search ................................ 370/17, 60, 94.1, 370/68, 79, 85.7, 85.8, 111, 85.2; 340/825.06

[56] References Cited

U.S. PATENT DOCUMENTS

| | | | |
|---|---|---|---|
| T955,010 | 2/1977 | Ragonese et al. | 395/184.01 |
| 4,227,245 | 10/1980 | Edblad et al. | 364/468 |
| 4,458,309 | 7/1984 | Wilder, Jr. | 364/200 |
| 4,459,656 | 7/1984 | Wilder, Jr. | 364/200 |
| 4,521,849 | 6/1985 | Wilder, Jr. | 364/200 |
| 4,779,194 | 10/1988 | Jennings et al. | 364/200 |
| 4,805,089 | 2/1989 | Lane et al. | 364/188 |
| 4,851,998 | 7/1989 | Hospodor | 364/300 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 364/200 |
| 5,035,302 | 7/1991 | Thangavelu | 187/125 |
| 5,062,055 | 10/1991 | Chinnaswamy et al. | 364/513 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,198,805 | 3/1993 | Whiteside et al. | 340/825.06 |
| 5,223,827 | 6/1993 | Bell et al. | 340/825.06 |
| 5,355,366 | 10/1994 | Li et al. | 370/111 |
| 5,365,514 | 11/1994 | Hershey et al. | 370/17 |
| 5,375,070 | 12/1994 | Hershey et al. | 364/550 |
| 5,394,408 | 2/1995 | Nishihara et al. | 370/17 |
| 5,495,426 | 2/1996 | WacLawsky et al. | 370/17 |
| 5,500,855 | 3/1996 | Hershey et al. | 370/17 |

*Primary Examiner*—Douglas W. Olms
*Assistant Examiner*—Shick Hom
*Attorney, Agent, or Firm*—John E. Hoel; John D. Flynn

[57] ABSTRACT

A system and method monitors and controls an asynchronous transfer mode (ATM) network having at least two ATM stations. An event driven interface is coupled to the ATM network for monitoring the selected ranges of contiguous non-empty cells and of contiguous empty cells communicated between the ATM stations and outputting count values for selected ranges of contiguous non-empty cells and of contiguous empty cells. An analysis computer is coupled to the output of the event driven interface, for analyzing the count values and outputting control signals. The control signals are used to reorder or change the time of transmission of data at a transmitting ATM station on the communications link, in response to the control signals.

3 Claims, 6 Drawing Sheets

COUNTER 1 [ ] NUMBER OF CONTIGOUS NON-EMPTY CELLS - 1ST GROUP

COUNTER 2 [ ] NUMBER OF CONTIGOUS EMPTY CELLS - AFTER 1ST GROUP

COUNTER 3 [ ] NUMBER OF CONTIGOUS NON-EMPTY CELLS - 2ND GROUP

COUNTER 4 [ ] NUMBER OF CONTIGOUS EMPTY CELLS - AFTER 2ND GROUP

COUNTER 7 [ ] NUMBER OF CONTIGOUS NON-EMPTY CELLS - 4TH GROUP

COUNTER 8 [ ] NUMBER OF CONTIGOUS EMPTY CELLS - AFTER 4TH GROUP

MONITORING ATM NETWORKS FOR BURSTINESS USING CELL FULL OR CELL EMPTY LATENCY WITH MINIMUM INFORMATION

FIELD OF THE INVENTION

The invention disclosed broadly relates to data processing systems and data communications systems and more particularly relates to the monitoring and control of networks for data processing systems.

BACKGROUND OF THE INVENTION

The invention disclosed herein is related to U.S. Pat. No. 5,365,514 by Hershey and Waclawsky et al entitled "Event Driven Interface for a System for Monitoring and Controlling a Data Communications Network", which is assigned to the IBM Corporation and incorporated herein by reference.

This invention is also related to U.S. Pat. No. 5,375,070 by Hershey and Waclawsky et al entitled "Information Collection Architecture and Method for a Data Communications Network", which is assigned to the IBM Corporation and incorporated herein by reference.

The problem of effectively and accurately monitoring and analyzing ATM networks is significant. There is a critical network management need to acquire and analyze ATM network traffic patterns. This problem is not adequately solved today. In order to successfully manage and control an ATM network, a system has to be able to monitor the substantial cell rate of ATM systems in real time. As traffic loads increase, cell discard activity can effect media utilization and overall network performance. Because of the very high speeds found in ATM networks, monitoring ATM media activity burstiness at any instant in time is also very important for good network management and control. Today, activities attempted in this area capture large quantities of data, missing substantial portions under varying conditions (load, buffers . . . etc.). Unfortunately, large quantities of data are captured when in most cases only small amounts of information are required.

The above cited patents by Hershey, et al. describe an Event Driven Interface (EDI) which is a mechanism for identifying bit patterns in the serial bit stream of a data communications network. The Event Driven Interface performs pattern recognition based upon a program defined by control vectors. The Event Driven Interface has an input connected to the data communications network for receiving the serial bit stream and for performing a logical pattern recognition on the serial bit stream to produce event vector signals as an output in response to the identification of specific, predefined patterns in the bit stream.

It would be useful to apply the realtime pattern recognition capability of the Event Driven Interface to the problem of monitoring, analyzing, and diagnosing (problem determination) an ATM network.

OBJECTS OF THE INVENTION

It is therefore an object of the invention to monitor an asynchronous transfer mode communications link in an improved manner.

It is another object of the invention to monitor an ATM communications link and alter data communicated over that link in an improved manner.

It is a further object of the invention to efficiently monitor, analyze and diagnose problems on an ATM network using the concept of measuring the number of empty cells between full cells (cell latency) on the media over an arbitrary period of time.

It is still a further object of the invention to efficiently monitor, analyze and diagnose problems on an ATM network using the concept of measuring and categorizing the number of contiguous full or empty cells on the media over an arbitrary period of time.

It is another object of the invention to efficiently monitor, analyze and diagnose problems on any network using variable length cells by measuring the number of bytes of empty cells between full cells and the converse.

It is still another object of the invention to utilize cell latency categorizations as a distribution histogram, using a minimum number of bits, to identify problems and monitor the activity on an ATM network.

It is still another object of the invention to allow the assessment of an ATM design (buffers, capacity, . . . etc.), using a minimum number of bits, with the histogram of the current activity, and the history of activity obtained by observing cell full and/or empty cell activity.

SUMMARY OF THE INVENTION

These and other objects, features and advantages are accomplished by the invention. A system and method monitors and controls an asynchronous transfer mode (ATM) network having at least two ATM stations. An event driven interface is coupled to the ATM network for monitoring the selected ranges of contiguous non-empty cells and of contiguous empty cells communicated between the ATM stations and outputting count values for selected ranges of contiguous non-empty cells and of contiguous empty cells. An analysis computer is coupled to the output of the event driven interface, for analyzing the count values and outputting control signals. The control signals are used to reorder or change the time of transmission of data at a transmitting ATM station on the communications link, in response to the control signals.

DESCRIPTION OF THE FIGURES

These and other objects, features and advantages will be more fully appreciated with reference to the accompanying Figures.

DISCUSSION OF THE PREFERRED EMBODIMENT

The invention uses an Event Driven Interface to perform network monitoring/performance, analysis, problem determination and ATM design based on the extraction of information from large bodies of data on high speed communication facilities, particularly ATM links.

The EDI provides a set of counters to count a set of events. For example a user can define two events: (1) Number of times a sequence of particular bits occurs in a "bit stream" (2) Total number of bytes; generated over a user chosen time period (e.g. 10 seconds). Using EDI we can program two counters; one to count the pattern matches the other to count the bytes or cells over a period of 10 seconds. Our method makes use of these counters to monitor the health, analyze and detect problems in a ATM network. The number of counters used is only limited by the particular implementation used.

Network analysis by assuming Poisson and other random distributions of arrival rates for network packets is now considered inaccurate for high speed networks, (see IEEE Network Magazine 93). Also, assuming exponential service time is inappropriate since the cells are of fixed size. ATM traffic is bursty in nature, hence the estimate for the buffer requirements at an ATM switch using Poisson or exponential assumptions will be completely off target. However, for efficient ATM design (including buffer sizes, etc.) and any analysis of ATM networks it may be important to know the arrival patterns of the cells including the empty cells. For complete accuracy, it is necessary to acquire this information on a cell by cell basis. Due to ATM network speed and the likelihood of finding bottlenecks in ATM monitoring/ analysis equipment with the bus, registers, memory and/or the processor, it will be very expensive to capture this (and other) monitoring information accurately. Using Information Collection Architecture (ICA) technology we can collect this information in groups of counters where the first counter holds the number of non-empty cells, the second counter holds the number of empty cells, etc. This invention allows counters in an EDI to collect cell latency information and save it to memory or disk in groups instead of collecting this information cell by cell. This significantly reduces access to the bus, the number of processor cycles required, memory needed, etc. We call this a flat reduction. The size of the flat reduction depends on the events that are specified and the number of counters that we use.

Figure 1:
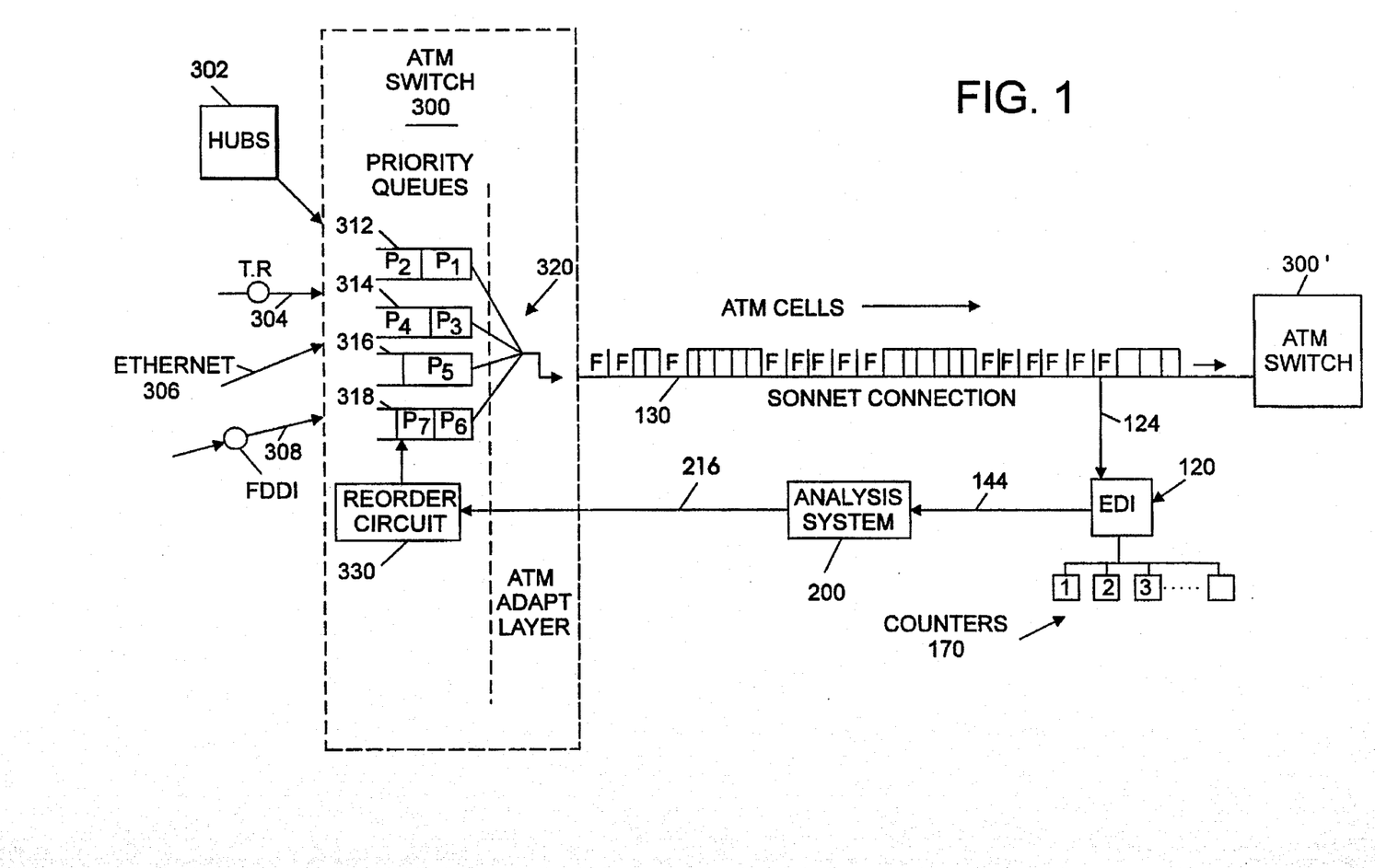
FIG. 1 is a schematic diagram of an ATM switch and a SONNET communications link, wherein an event driven interface is connected to the communications link to monitor and control communications on the link.

FIG. 1 shows an example of an ATM switch 300 connecting to another ATM switch 300'. There is a SONNET connection 130 between the ATM switches 300 and 300' in which ATM cells are being transmitted. A monitoring facility exists on the SONNET connection in EDI 120. EDI 120 develops counts in counters 170 of recognized patterns occurring on the media 130. The ATM switch 300 has input data arriving in random fashion from hubs 302, token rings 304, Ethernet 306 and FDDI 308 connections among other technology connections, including additional SONNET connections. The input data to ATM switch 300 from these connections can be placed in priority queues 312, 314, 316 and 318, respectively. The priority queues are serviced by the ATM adaption layer 320 which does two things, (1) services the queues in a particular order as defined by an algorithm or a user defined process that is part of the adaption layer, and (2) takes the packets, labelled P1, P2, P3, etc. and segments these packets into 48 byte payloads that are placed with a 5 byte header into a 53 byte ATM cell.

Figure 2:
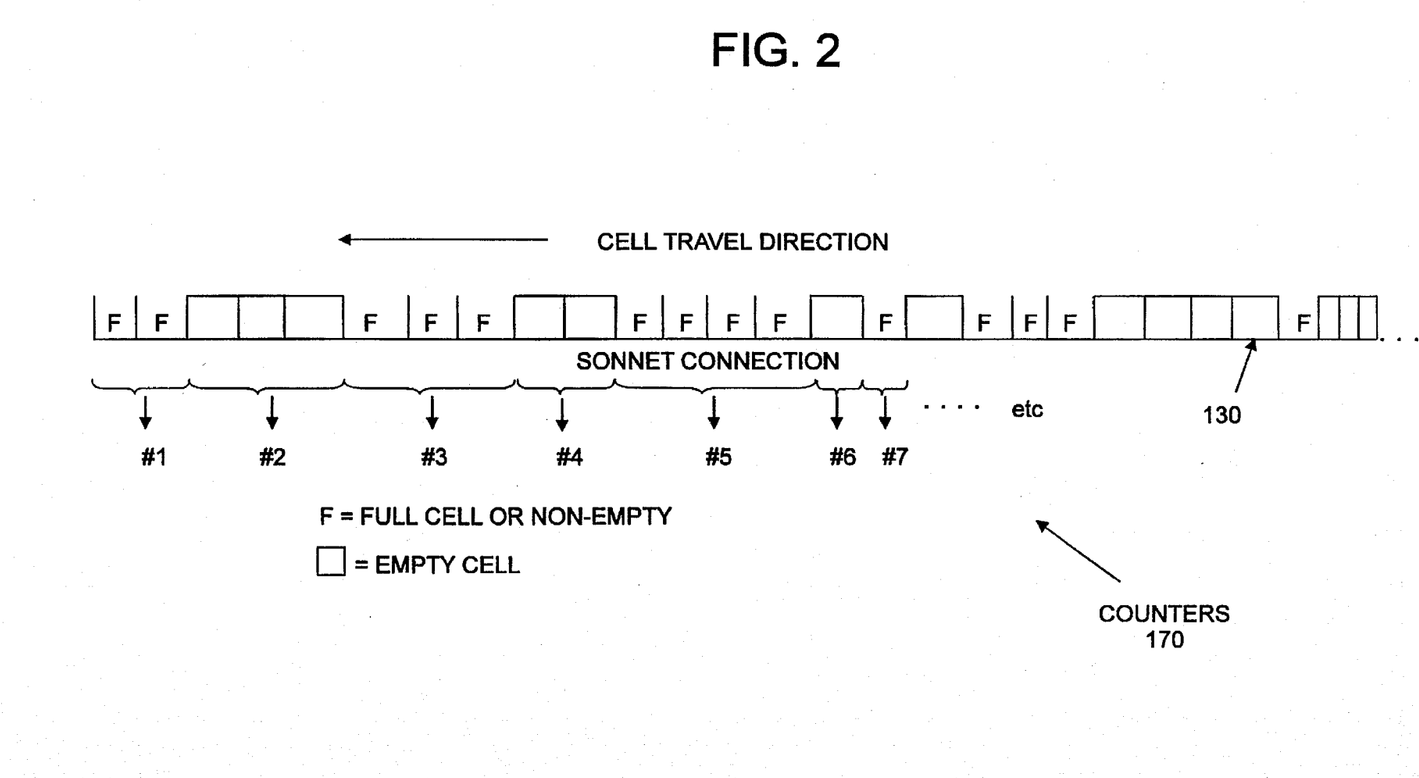
FIG. 2 is a waveform diagram illustrating an example of the sequence of populated and unpopulated ATM cells on the SONNET communications link 130.

In FIG. 2, there is a series of full and empty cells going over a SONNET connection 130. The block labelled F is a full cell. Any blocks without a letter are empty cells. There are counters 170 that are setup to collect the number of contiguous full or empty cells that are seen at the SONNET connection during any period of time.

Figure 3:
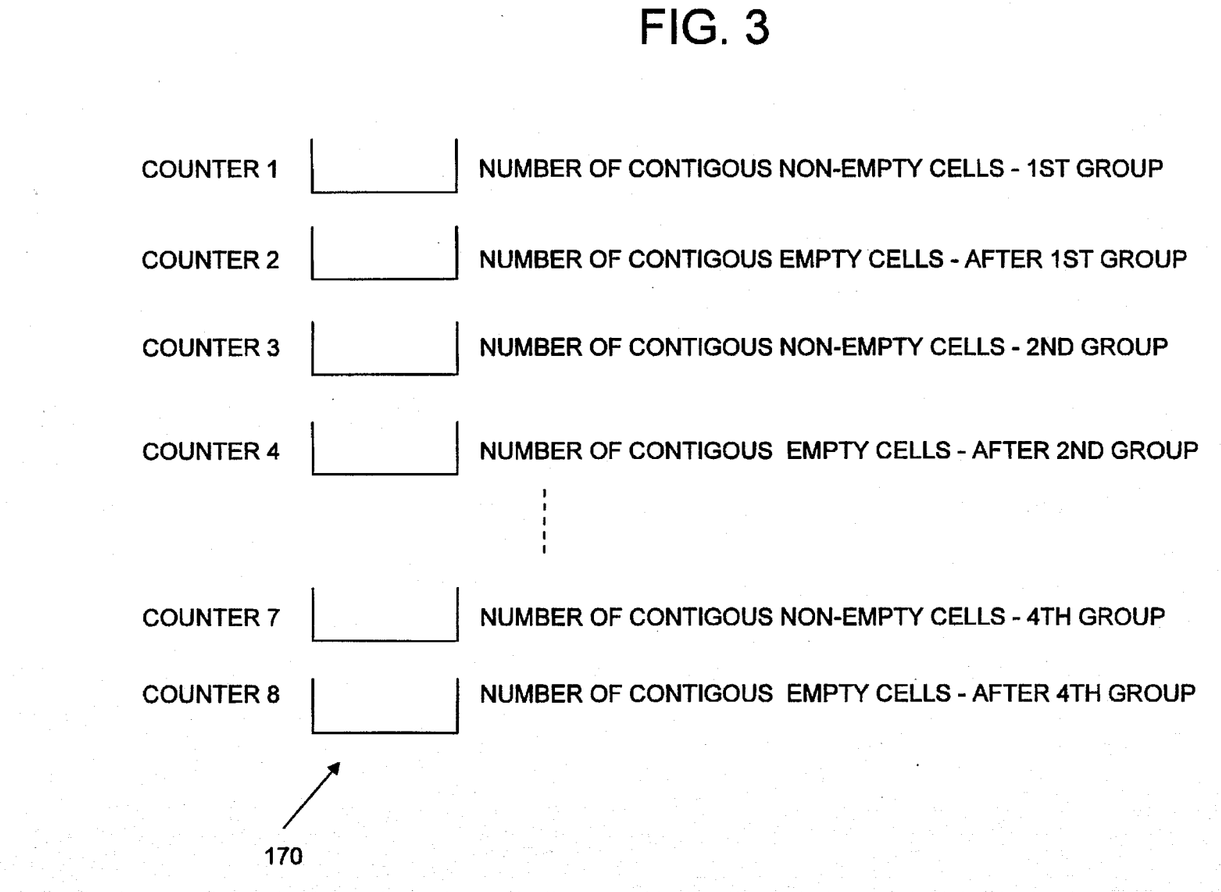
FIG. 3 illustrates some example counters 170 for the EDI 120, in accordance with the invention.

FIG. 3 shows an example of counters 170, which are individually identified as 1 through 8, and which are programmed in the EDI 120 to count the number of contiguous full or empty cells or groupings of these cells going across the SONNET connection 130. For example, counter 1 shows the number of contiguous non-empty cells found in the first group. In FIG. 3, counter 1 would have a value of 2 where monitoring an example data flow shown in FIG. 2. Counter 2 in FIG. 3 shows the contiguous number of empty cells after the first group of full cells. Again refer to FIG. 2 where the value in there would be 3. Counter 3 shows the number of contiguous nonempty cells in the second group and that is 3 for the example of FIG. 2, etc. Each counter keeps track of groups of contiguous empty or non-empty cells.

Figure 4:
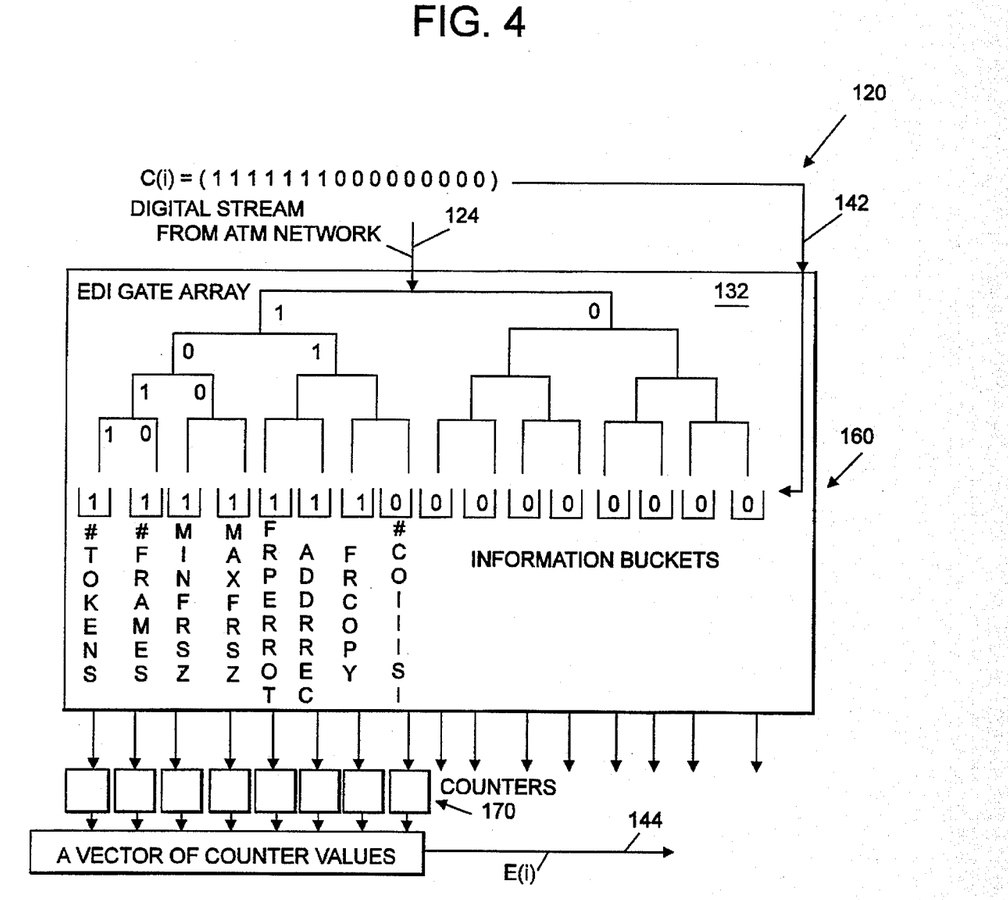
FIG. 4 illustrates the event driven interface (EDI), which is described in greater detail in U.S. Pat. No. 5,365,514, FIG. 9.
Figure 6:
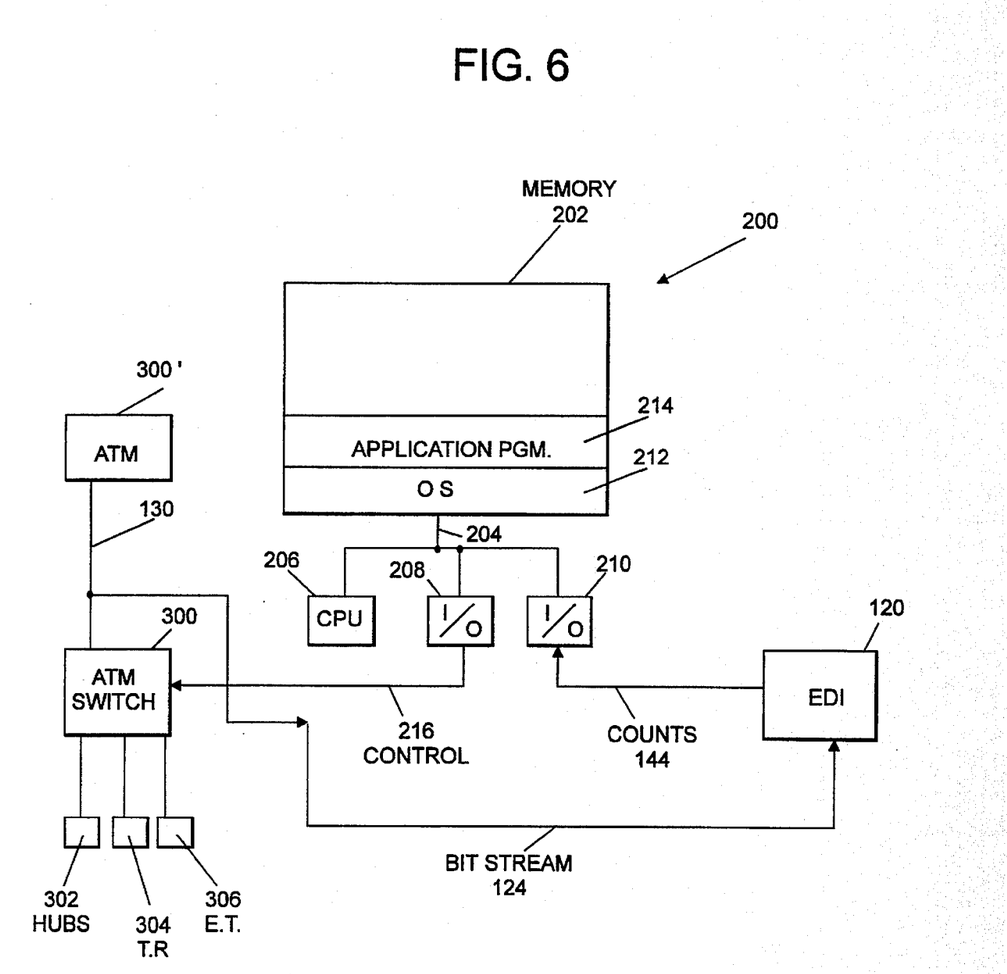
FIG. 6 is a functional block diagram of the system for analyzing the ATM population of full and empty cells on a SONNET communications link connecting two ATM switches.

FIG. 4 is a functional block diagram of the event driven interface (EDI) 120, which is described in greater detail in U.S. Pat. No. 5,365,514, assigned to the IBM Corporation and incorporated herein by reference. The EDI 120 receives a digital stream of data 124 which is shown in FIG. 6 and FIG. 1 as coming from the SONNET communications link 130. The bitstream 124 arriving in the EDI 120, is subjected to pattern recognition as is described in the above referenced patent, and results in the accumulation of event counts in the counters 170. The output of the counters 170 is output on line 144 as is shown in FIG. 6 and FIG. 1.

Figure 5A:
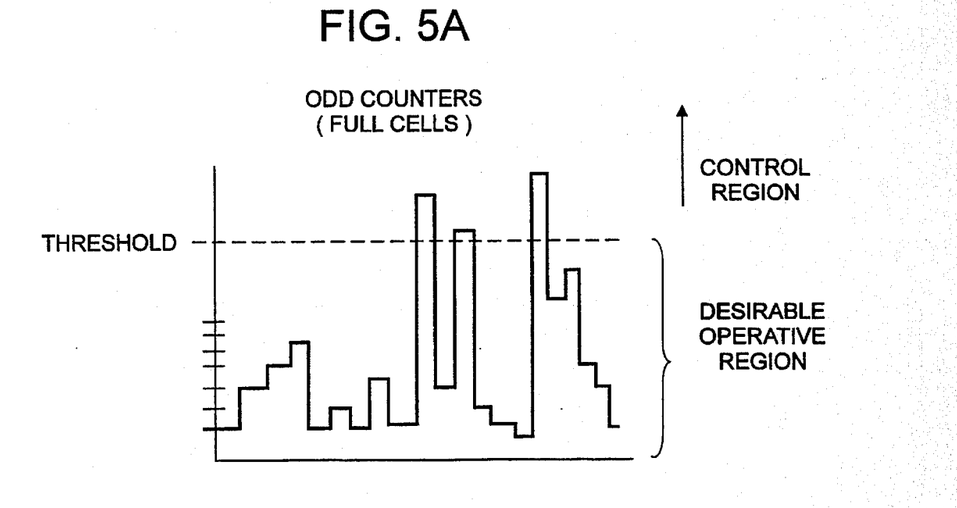
FIG. 5A and 5B are rolling histograms of the accumulated counts for the counters 170, for an example operation of the invention.
Figure 5B:
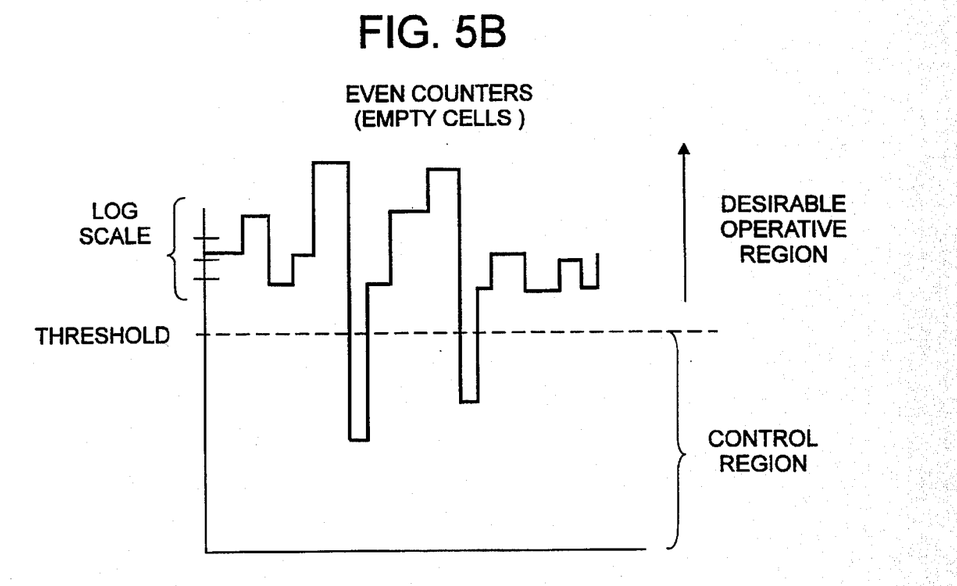

FIG. 5A and 5B show example histograms that are for the accumulated counters provided in the counters 170 for the EDI 120.

Returning to FIG. 6, the analysis and control system 200 is shown which includes the memory 202 which is connected by means of the bus 204 to CPU 206, the first I/O unit 208, and the second I/O unit 210. Contained in the memory 202 is an operating system 212 and an application program 214. The application program 214 provides the analysis function which will be discussed in connection with FIGS. 5A and 5B.

As is shown in FIG. 6, the count output on line 144 from the EDI 120, is applied to the I/O unit 210 for the system 200. The application program 214 analyzes the counts from EDI 120, and then outputs control signals over the I/O unit 208 and the line 216 to the ATM switch 300. In response to the control signals on line 216, the priority queues 312, 314, 316 and 318 shown in FIG. 1, can be reconfigured. Reconfiguration of the priority queues in FIG. 1 is done in response to a determination by the system 200 that deviations have occurred in the pattern of populated and unpopulated ATM cells on the SONNET connection 130.

Turning now to the histogram diagrams of FIGS. 5A and 5B, an example is shown of how the application program 214 will analyze the counts on line 144 and provide control signals on the output line 216 to the ATM switch 300.

FIG. 5A shows an example of the odd counters 1, 3, 5 and 7 shown in FIG. 3, the even counters would be counters 2, 4, 6 and 8, also shown in FIG. 3. FIGS. 5A and 5B collectively represent the odd and even counters, where the odd counters are collected in FIG. 5A, and the even counters are collected in FIG. 5B. FIG. 5A represents the distribution of the burstiness of the full cells on the SONNET media. FIG. 5B represents the distribution of the availability of the empty cells that are on the SONNET media. There are two regions described in FIG. 5A, one is the desirable operating region which is shown at the bottom end of the threshold value, the other region is the control region. The control region is an area that is indicated above the threshold which identifies the fact that there are significant number of full contiguous cells or a high degree of burstiness exists on the SONNET facility. Therefore it is quite possible that either cells will be dropped at the receiving ATM switch, in which case retransmissions must take place or some traffic will not get enough capacity. If that should happen then isochronous traffic flows may be impacted. Again looking at FIG. 5A, we see a control region and a desirable operating region. If the bursty nature of the cells forces high values in the odd counters to occur, then we will potentially cross the threshold line in which case some form of control will be executed by the ATM switch to give higher priority queues preferential service to ensure they get the needed ATM network capacity. A similar control structure exists with the even counters or the empty cells. There is a desirable operating region which is above the threshold, which says there is an available supply of empty counters. If the empty counter moves below the threshold point then again we enter a control region in which case the priority mechanism in the ATM switch can be invoked to give preferential treatment to the high priority traffic because of the lack of available capacity on the SONNET connection.

These FIGS., 5A and 5B can represent the organization of groups of counters, for example, over a time period. The counters can be represented as groups of counters 1 through counter 8 looked at as a snapshot where 1, 3, 5 and 7 would be represented in FIG. 5A and 2, 4, 6 and 8 in FIG. 5B. The next period of time counter 1, 3, 5 and 7 would have different values in them and 2, 4, 6 and 8 would have values in them from the next series of groups of full and empty cells. These counters 1 through 8, (or counters 1 through an arbitrary number), will be constantly sent from the EDI 120 on line 144. They will be either controlled by some periodic interval which asks for the counts or they will come out after they are filled out and will be refilled constantly by the bitstream. Therefore 144 will represent a steady flow of counter information up to the operating system 212 which is providing the counter data to histogram application program in 214. The application 214 can view FIG. 5A or 5B as a snapshot of counter values or a rolling window of counter values in which if the values get into the control region (or stay there long enough) the appropriate activity will be taken via the control line on 216 to adjust the mechanism within the ATM switch 300 in how it services the priority queues 312, 314, 316 and 318.

Returning to the ATM switch 300 of FIG. 1, the result of receiving the control signal 216 from the analyzer 200 in FIG. 6, is to control a reordering circuit 330. The reordering circuit 330 can be, for example, a buffer switching mechanism which enables the switching of the position of stored data in the respective priority queues 312, 314, 316 and 318 in a time ordered manner. As an example, if the time of transmission of a particular priority queue 312 must be advanced, the reordering circuit 330 will take the contents of each respective cell, for example, P1 and P2 and will advance them in position in the priority queue 312 so that their time of transmission over the SONNET connection 130 is advanced. Other rearrangements of the contents of the priority queues 312, 314, 316 and 318 can be accomplished by the reordering circuit 330, in response to the control signals 216 from the monitor and control system 200 of FIG. 6.

The control line 216 into the ATM switch 300 can control the ordering of the priority queues and the ordering of the packets within the queues. The queues can be serviced round robin or could be serviced by high priority, medium priority, low priority etc., in an overflow fashion. In addition some queues may not be serviced, for example the two lower priority queues. Let us assume queue 316 and 318 are medium low and low and let's assume 312 and 314 are high and medium. It is quite possible by looking at FIG. 5B that every time the counter cells fall below the threshold line in FIG. 5B indicating insufficient ATM cell availability, the system can stop selecting packets from the low and medium low priority queues so that access to the medium can be controlled to prevent congestion at ATM switch 300'.

Although a specific embodiment has been disclosed, it will be understood by those having skill in the art that changes can be made to the specific embodiment without departing from the spirit and the scope of the invention.

What is claimed is:

1. A system for monitoring and controlling an ATM network having at least a first and a second ATM station connected by a communications link and merging plural input streams into a consolidated stream on the link, comprising:

an event driven interface coupled to the communications link for monitoring contiguous non-empty cells and contiguous empty cells of the consolidated stream communicated by the ATM stations on the communications link, and outputting count values for selected contiguous non-empty cell ranges and contiguous empty cell ranges;

an analysis computer means coupled to an output of the event driven interface, for analyzing the count values and outputting control signals;

a data reordering means, coupled to an output of the analysis computer means, and coupled to at least one of said ATM stations on said communications link, for altering the relative position of the plural input streams to be transmitted over the communications link in response to the control signals.

2. A method for monitoring and controlling an ATM network having at least a first and a second ATM station coupled by a communications link and merging plural input streams into a consolidated stream on the link, comprising:

monitoring with an event driven interface, contiguous non-empty cells and contiguous empty of the consolidated stream communicated by ATM stations on the communications link;

outputting count values for selected contiguous non-empty cell ranges and contiguous empty cells ranges;

analyzing the count values and outputting control signals; and altering the relative position of the plural input streams to be transmitted over the communications link in response to the control signals.

3. A system monitoring and controlling an ATM network having at least a first and a second ATM stations couples by a communications link and merging plural input streams into a consolidated stream on the link, comprising:

an event driven interface coupled to the communications link for monitoring contiguous non-empty cells and contiguous of the consolidated stream communicated by the ATM stations on the communications link, and outputting count values for selected contiguous non-empty cells ranges and contiguous empty cell ranges;

an analysis computer coupled to an output of the event driven interface, for analyzing the count values and outputting control signals;

a data reordering circuit coupled to an output of the analysis computer, and coupled to at least one of said ATM stations on said communications link, for altering the relative position of the plural input streams to be transmitted over the communications link in response to the control signals.

* * * * *